(12) United States Patent
Atsushi et al.

(10) Patent No.: US 11,904,867 B2
(45) Date of Patent: Feb. 20, 2024

(54) CONTROLLER, VEHICLE BODY BEHAVIOR CONTROL SYSTEM, MOTORCYCLE, AND CONTROL METHOD

(71) Applicant: Robert Bosch GmbH, Stuttgart (DE)

(72) Inventors: Hiroaki Atsushi, Kanagawa (JP); Jun Ohtaka, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 153 days.

(21) Appl. No.: 16/636,123

(22) PCT Filed: Jul. 12, 2018

(86) PCT No.: PCT/IB2018/055132
§ 371 (c)(1),
(2) Date: Feb. 3, 2020

(87) PCT Pub. No.: WO2019/025886
PCT Pub. Date: Feb. 7, 2019

(65) Prior Publication Data
US 2021/0107491 A1    Apr. 15, 2021

(30) Foreign Application Priority Data
Aug. 2, 2017   (JP) ................... 2017-149793

(51) Int. Cl.
*B60W 40/09*  (2012.01)
*B62K 11/00*  (2006.01)
(Continued)

(52) U.S. Cl.
CPC ............ *B60W 40/09* (2013.01); *B62K 11/00* (2013.01); *G06V 20/56* (2022.01); *B60W 2300/36* (2013.01); *B60W 2510/18* (2013.01)

(58) Field of Classification Search
None
See application file for complete search history.

(56) References Cited

U.S. PATENT DOCUMENTS

2011/0178680 A1* 7/2011 Kato ................. B60W 50/0097
                                                701/1
2014/0015662 A1* 1/2014 Oettgen ............... B60W 40/08
                                                340/439
(Continued)

FOREIGN PATENT DOCUMENTS

DE    102012221615    5/2014
DE    102013200044    7/2014
(Continued)

OTHER PUBLICATIONS

International Search Report for Application No. PCT/IB2018/055132 dated Oct. 25, 2018 (English Translation, 2 pages).

*Primary Examiner* — Aniss Chad
*Assistant Examiner* — Madison R Hughes
(74) *Attorney, Agent, or Firm* — Michael Best & Friedrich LLP (57) ABSTRACT

The present invention obtains a controller capable of improving safety of a motorcycle.
The controller that controls vehicle body behavior of the motorcycle includes: an acquisition section that acquires trigger information generated in accordance with peripheral environment of the motorcycle; and an execution section that initiates a control mode making the motorcycle execute an automatic brake operation in accordance with the trigger information acquired by the acquisition section and makes the motorcycle generate a braking force. The acquisition section further acquires deceleration resistance information that is information related to a driver's driving posture on the motorcycle, and the execution section changes a control command that is output in the control mode in accordance with the deceleration resistance information acquired by the acquisition section.

11 Claims, 6 Drawing Sheets

(51) Int. Cl.

| | | |
|---|---|---|
| *G06V 20/56* | (2022.01) | |
| *G08G 1/16* | (2006.01) | |
| *B60T 7/20* | (2006.01) | |
| *B60T 8/00* | (2006.01) | |
| *B60T 8/17* | (2006.01) | |
| *B60T 8/32* | (2006.01) | |
| *B60T 13/66* | (2006.01) | |
| *B60T 13/68* | (2006.01) | |
| *B60T 17/22* | (2006.01) | |
| *B60T 7/14* | (2006.01) | |

(56) References Cited

U.S. PATENT DOCUMENTS

| | | | |
|---|---|---|---|
| 2018/0111628 A1* | 4/2018 | Tamagaki | B60W 30/16 |
| 2018/0208189 A1* | 7/2018 | Ginther | B60W 30/095 |
| 2019/0100175 A1* | 4/2019 | Takeuchi | G08G 1/166 |
| 2019/0135248 A1* | 5/2019 | Iizuka | B60T 8/17555 |
| 2020/0031339 A1* | 1/2020 | Tanaka | B60W 30/17 |

FOREIGN PATENT DOCUMENTS

| | | | | |
|---|---|---|---|---|
| EP | 3604097 A1 * | 2/2020 | | B62K 21/00 |
| JP | 2009116882 | 5/2009 | | |
| JP | 2010215198 A | 9/2010 | | |
| JP | 2017178284 A * | 10/2017 | | |

\* cited by examiner

CONTROLLER, VEHICLE BODY BEHAVIOR CONTROL SYSTEM, MOTORCYCLE, AND CONTROL METHOD

BACKGROUND OF THE INVENTION

The present invention relates to a controller and a control method for controlling vehicle body behavior of a motorcycle, a vehicle body behavior control system including the controller, and a motorcycle including the vehicle body behavior control system.

As a technique related to a motorcycle (a two-wheeled motor vehicle or a three-wheeled motor vehicle), a technique of improving driver safety has been available. For example, a driver-assistance system is disclosed in JP-A-2009-116882. The driver-assistance system warns a driver of the motorcycle on the basis of a detection result of a peripheral environment detector that detects peripheral environment (for example, an obstacle, a preceding vehicle, or the like) of the motorcycle during travel.

SUMMARY OF THE INVENTION

By the way, in order to improve the driver safety, it is considered to be effective that a vehicle body behavior control system capable of executing an automatic brake operation is adopted for the motorcycle and automatically controls the behavior of the motorcycle in accordance with the peripheral environment. The automatic brake operation is an operation that does not require an operation by the driver and automatically decelerates the motorcycle by generating a braking force on the motorcycle. For example, in regard to a four-wheeled vehicle and the like, the driver safety is secured even when the automatic brake operation that is unexpected by the driver is executed. On the other hand, in regard to the motorcycle, when the automatic brake operation that is unexpected by the driver is executed, it may be difficult to secure the driver safety due to the driver's driving posture with poor deceleration resistance.

The present invention has been made with the above-described problem as the background and therefore obtains a controller and a control method capable of improving safety of a motorcycle. The present invention also obtains a vehicle body behavior control system that includes such a controller. The present invention further obtains a motorcycle that has such a vehicle body behavior control system.

A controller according to the present invention is a controller that controls vehicle body behavior of a motorcycle, and includes: an acquisition section that acquires trigger information generated in accordance with peripheral environment of the motorcycle; and an execution section that initiates a control mode making the motorcycle execute an automatic brake operation in accordance with the trigger information acquired by the acquisition section and makes the motorcycle generate a braking force. The acquisition section further acquires deceleration resistance information that is information related to a driver's driving posture on the motorcycle, and the execution section changes a control command that is output in the control mode in accordance with the deceleration resistance information acquired by the acquisition section.

A vehicle body behavior control system according to the present invention is a vehicle body behavior control system for a motorcycle, includes: a peripheral environment detector that detects peripheral environment of the motorcycle; and a controller that controls vehicle body behavior of the motorcycle, and further includes an external force detector that detects an external force acting on the motorcycle. The controller includes: an acquisition section that acquires trigger information generated in accordance with a detection result of the peripheral environment detector; and an execution section that initiates a control mode making the motorcycle execute an automatic brake operation in accordance with the trigger information acquired by the acquisition section and makes the motorcycle generate a braking force. The acquisition section further acquires deceleration resistance information that is information related to a driver's driving posture on the motorcycle on the basis of a detection result of the external force detector, and the execution section changes a control command that is output in the control mode in accordance with the deceleration resistance information acquired by the acquisition section.

A motorcycle according to the present invention includes the above-described vehicle body behavior control system.

A control method according to the present invention is a control method that controls vehicle body behavior of a motorcycle and includes: an acquisition step of acquiring trigger information that is generated in accordance with peripheral environment of the motorcycle; and an execution step of initiating a control mode that makes the motorcycle execute an automatic brake operation in accordance with the trigger information acquired in the acquisition step and making the motorcycle generate a braking force. In the acquisition step, deceleration resistance information that is information related to a driver's driving posture on the motorcycle is further acquired. In the execution step, a control command that is output in the control mode is changed in accordance with the deceleration resistance information acquired in the acquisition step.

In the controller, the vehicle body behavior control system, the motorcycle, and the control method according to the present invention, the control mode that makes the motorcycle execute the automatic brake operation is initiated in accordance with the trigger information that is generated in accordance with the peripheral environment of the motorcycle. In addition, the control command, which is output in the control mode, is changed in accordance with the deceleration resistance information that is the information related to the driver's driving posture on the motorcycle. Accordingly, in the case where the automatic brake operation that is unexpected by the driver is executed, the motorcycle can be decelerated while the insufficient deceleration resistance of the driver's driving posture is taken into consideration. Therefore, safety of the motorcycle is improved.

DETAILED DESCRIPTION

A description will hereinafter be made on a controller, a vehicle body behavior control system, a motorcycle, and a control method according to the present invention by using the drawings.

Note that each of a configuration, an operation, and the like, which will be described below, is merely one example, and the controller, the vehicle body behavior control system, the motorcycle, and the control method according to the present invention are not limited to a case with such a configuration, such an operation, and the like.

For example, a description will hereinafter be made on a case where the motorcycle is a two-wheeled motor vehicle; however, the motorcycle may be another motorcycle (a three-wheeled motor vehicle). In addition, a description will hereinafter be made on a case where a braking force that is generated in each wheel is controlled by using a hydraulic pressure control unit; however, another mechanism may be used to control the braking force that is generated in each of the wheels. Furthermore, a description will hereinafter be made on a case where the controller executes an automatic brake operation by controlling the braking force that is generated in each of the wheels; however, the controller may execute the automatic brake operation by controlling a braking force that is generated in an engine. Moreover, a description will hereinafter be made on a case where each of a front-wheel brake mechanism and a rear-wheel brake mechanism is provided in one unit; however, at least one of the front-wheel brake mechanism and the rear-wheel brake mechanism may be provided in multiple units. Lastly, a description will hereinafter be made on a case where a peripheral environment detector that detects environment in front of the motorcycle is used and the automatic brake operation is executed in regard to a target (for example, an obstacle, a preceding vehicle, or the like) located in front of the motorcycle; however, a peripheral environment detector that detects environment in another direction (for example, a lateral direction or the like) of the motorcycle may be used, and the automatic brake operation may be executed in regard to the target located in this direction of the motorcycle.

The same or similar description will appropriately be simplified or will not be made below. In the drawings, the same or similar members or portions will be denoted by the same reference sign. In addition, a detailed structure will appropriately be depicted in a simplified manner or will not be depicted.

Embodiment 1

A description will hereinafter be made on a vehicle body behavior control system according to Embodiment 1.
<Configuration of Vehicle Body Behavior Control System>
A description will hereinafter be made on a configuration of the vehicle body behavior control system according to Embodiment 1.

Figure 1:
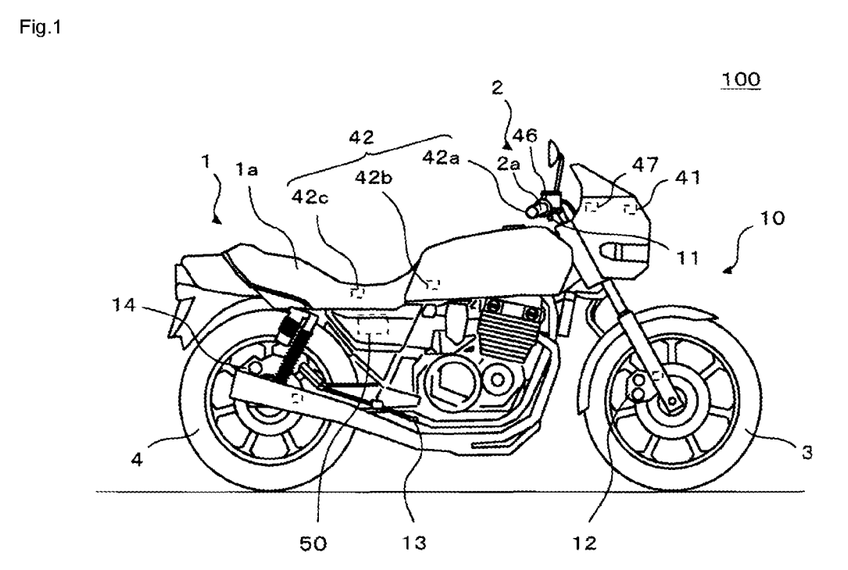
FIG. 1 is a view of a state where a vehicle body behavior control system according to Embodiment 1 of the present invention is mounted on a motorcycle.
Figure 2:
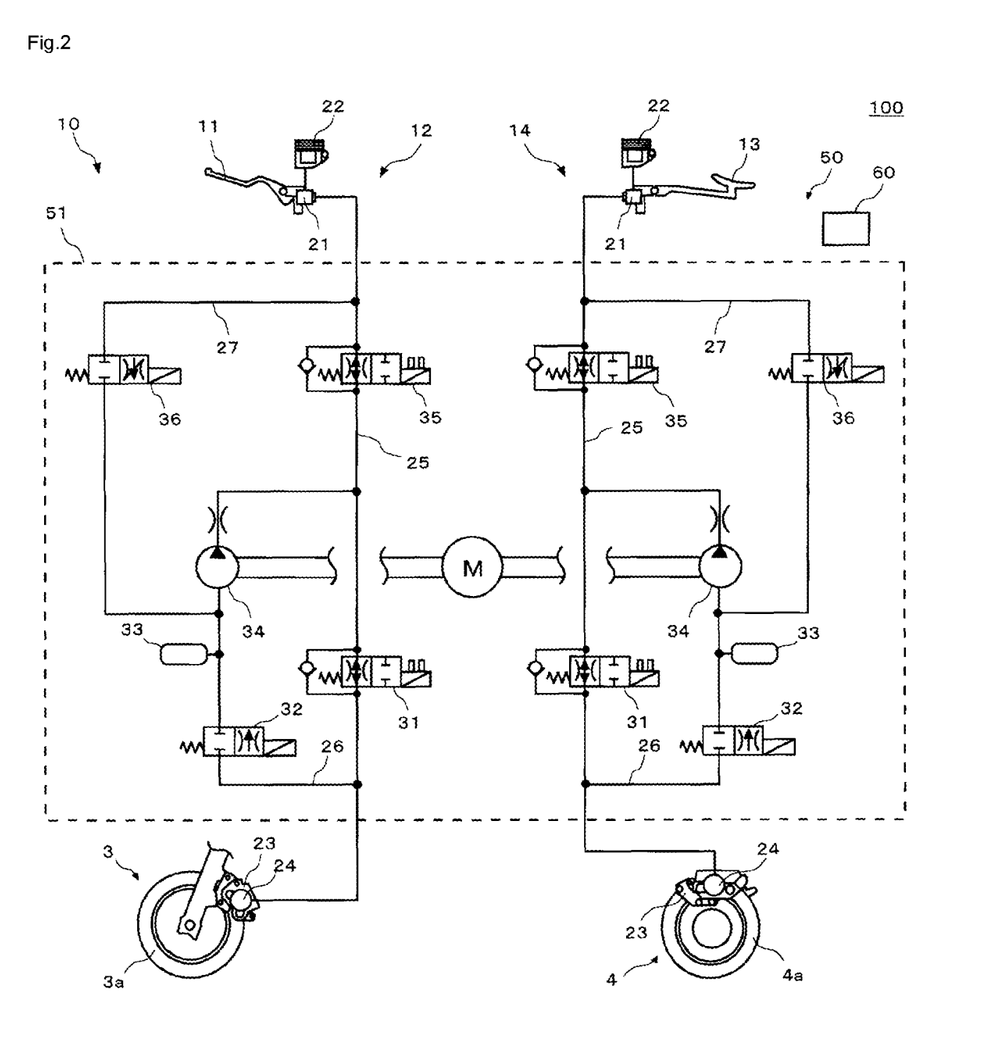
FIG. 2 is a view of a schematic configuration of the vehicle body behavior control system according to Embodiment 1 of the present invention.
Figure 3:
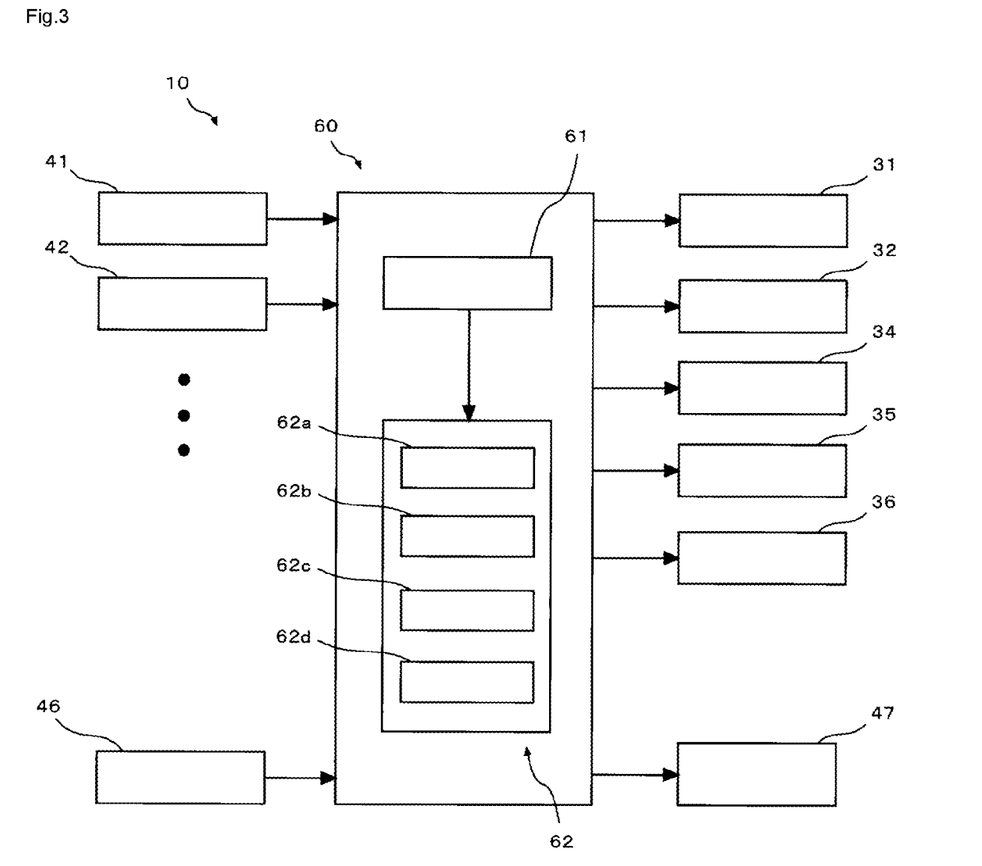
FIG. 3 is a system configuration diagram of the vehicle body behavior control system according to Embodiment 1 of the present invention.

FIG. 1 is a view of a state where the vehicle body behavior control system according to Embodiment 1 of the present invention is mounted on the motorcycle. FIG. 2 is a view of the schematic configuration of the vehicle body behavior control system according to Embodiment 1 of the present invention. FIG. 3 is a system configuration diagram of the vehicle body behavior control system according to Embodiment 1 of the present invention.

As depicted in FIG. 1 and FIG. 2, a vehicle body behavior control system 10 is mounted on a motorcycle 100. The motorcycle 100 includes: a trunk 1; a handlebar 2 that is held by the trunk 1 in a freely turnable manner; a front wheel 3 that is held by the trunk 1 in the freely turnable manner with the handlebar 2; and a rear wheel 4 that is held by the trunk 1 in a freely rotatable manner.

For example, the vehicle body behavior control system 10 includes: a first brake operation section 11; a front-wheel brake mechanism 12 that brakes the front wheel 3 in an interlocking manner with at least the first brake operation section 11; a second brake operation section 13; and a rear-wheel brake mechanism 14 that brakes the rear wheel 4 in the interlocking manner with at least the second brake operation section 13.

The first brake operation section 11 is provided on the handlebar 2 and is operated by a driver's hand. The first brake operation section 11 is a brake lever, for example. The second brake operation section 13 is provided in a lower portion of the trunk 1 and is operated by the driver's foot. The second brake operation section 13 is a brake pedal, for example.

Each of the front-wheel brake mechanism 12 and the rear-wheel brake mechanism 14 includes: a master cylinder 21 in which a piston (not depicted) is installed; a reservoir 22 that is attached to the master cylinder 21; a brake caliper 23 that is held by the trunk 1 and has a brake pad (not depicted); a wheel cylinder 24 that is provided in the brake caliper 23; a primary channel 25 through which brake fluid in the master cylinder 21 is delivered to the wheel cylinder 24; a secondary channel 26 through which the brake fluid in the wheel cylinder 24 is released; and a supply channel 27 through which the brake fluid in the master cylinder 21 is supplied to the secondary channel 26.

An inlet valve (EV) 31 is provided in the primary channel 25. The secondary channel 26 bypasses a portion of the primary channel 25 between the wheel cylinder 24 side and the master cylinder 21 side of the inlet valve 31. The secondary channel 26 is sequentially provided with an outlet valve (AV) 32, an accumulator 33, and a pump 34 from an upstream side. Between an end of the primary channel 25 on the master cylinder 21 side and a portion thereof to which a downstream end of the secondary channel 26 is connected, a first valve (USV) 35 is provided. The supply channel 27 communicates between the master cylinder 21 and a suction side of the pump 34 in the secondary channel 26. A second valve (HSV) 36 is provided in the supply channel 27.

The inlet valve 31 is an electromagnetic valve that is opened in an unenergized state and closed in an energized state, for example. The outlet valve 32 is an electromagnetic valve that is closed in an unenergized state and opened in an energized state, for example. The first valve 35 is an electromagnetic valve that is opened in an unenergized state and is closed in an energized state, for example. The second valve 36 is an electromagnetic valve that is closed in an unenergized state and is opened in an energized state, for example.

A hydraulic pressure control unit 50 is configured by including: members such as the inlet valves 31, the outlet valves 32, the accumulators 33, the pumps 34, the first valves 35, and the second valves 36; a base body 51 that is provided with those members and is formed with channels constituting the primary channels 25, the secondary channels 26, and the supply channels 27 therein; and a controller (ECU) 60. In the vehicle body behavior control system 10, the hydraulic pressure control unit 50 is a unit that has a function of controlling a hydraulic pressure of the brake fluid in each of the wheel cylinders 24, that is, a braking force exerted on the front wheel 3 by the front-wheel brake mechanism 12 and a braking force exerted on the rear wheel 4 by the rear-wheel brake mechanism 14.

The members may collectively be provided in the single base body 51 or may separately be provided in the multiple base bodies 51. In addition, the controller 60 may be provided as one unit or may be divided into multiple units. Furthermore, the controller 60 may be attached to the base body 51 or may be attached to a member other than the base body 51. Moreover, the controller 60 may partially or entirely be constructed of a microcomputer, a microprocessor unit, or the like, may be constructed of a member in which firmware or the like can be updated, or may be a program module or the like that is executed by a command from a CPU or the like, for example.

In a normal state, that is, in a state where the automatic brake operation, which will be described below, is not executed, the controller 60 opens the inlet valves 31, closes the outlet valves 32, opens the first valves 35, and closes the second valves 36. When the first brake operation section 11 is operated in such a state, in the front-wheel brake mechanism 12, the piston (not depicted) in the master cylinder 21 is pressed to increase the hydraulic pressure of the brake fluid in the wheel cylinder 24, the brake pad (not depicted) of the brake caliper 23 is then pressed against a rotor 3a of the front wheel 3, and the braking force is thereby exerted on the front wheel 3. Meanwhile, when the second brake operation section 13 is operated, in the rear-wheel brake mechanism 14, the piston (not depicted) in the master cylinder 21 is pressed to increase the hydraulic pressure of the brake fluid in the wheel cylinder 24, the brake pad (not depicted) of the brake caliper 23 is then pressed against a rotor 4a of the rear wheel 4, and the braking force is thereby exerted on the rear wheel 4.

As depicted in FIG. 1 and FIG. 3, the vehicle body behavior control system 10 includes: various detectors including a peripheral environment detector 41 and an external force detector 42; an input device 46, and a warning device 47. Each of the various detectors, the input device 46, and the warning device 47 is communicable with the controller 60.

The peripheral environment detector 41 detects peripheral environment of the motorcycle 100. For example, the peripheral environment detector 41 detects a distance from the motorcycle 100 to a forward obstacle (for example, a structural object, a pedestrian crossing a road, a vehicle traveling on a crossing road, or the like) as the peripheral environment. The peripheral environment detector 41 may detect another physical quantity that can substantially be converted to the distance from the motorcycle 100 to the forward obstacle. More specifically, a camera that captures an image in front of the motorcycle 100 or a distance measurement sensor that can detect the distance from the motorcycle 100 to the forward obstacle is used as the peripheral environment detector 41. The peripheral environment detector 41 is provided in a front portion of the trunk 1.

In addition, the peripheral environment detector 41 generates trigger information in accordance with the peripheral environment and outputs the trigger information. The trigger information is used to determine initiation of a control mode, which will be described below. Furthermore, the peripheral environment detector 41 computes a target braking force in conjunction with generation of the trigger information and outputs a computation result. The target braking force is a target value of an automatic braking force that is the braking force exerted on the wheels of the motorcycle 100 by the automatic brake operation executed in the control mode.

For example, the peripheral environment detector 41 computes a body speed of the motorcycle 100 on the basis of rotational frequencies of the front wheel 3 and the rear wheel 4, and estimates duration before arrival on the basis of the distance from the motorcycle 100 to the forward obstacle and the body speed. The duration before arrival is duration before the motorcycle 100 arrives at the forward obstacle. In the case where the duration before arrival is shorter than reference duration, the peripheral environment detector 41 generates the trigger information that is used to determine the initiation of the control mode in which an automatic emergency braking operation is executed as the automatic brake operation. The automatic emergency braking operation is the automatic brake operation that is executed to make the motorcycle 100 stop before arriving at the forward obstacle. The reference duration is set in accordance with estimated duration before the motorcycle 100 stops in the case where the motorcycle 100 executes the automatic emergency braking operation.

In this case, more specifically, the peripheral environment detector 41 computes the braking force with which the motorcycle 100 can stop before arriving at the forward obstacle by the automatic emergency braking operation as the target braking force. Such a target braking force is computed on the basis of the distance from the motorcycle 100 to the forward obstacle and the body speed, for example.

In addition, for example, in the case where a distance from the motorcycle 100 to a preceding vehicle falls below a distance reference value when the driver selects an autonomous cruise travel mode, which will be described below, the peripheral environment detector 41 generates the trigger information that is used to determine the initiation of the control mode in which an autonomous cruise braking operation is executed as the automatic brake operation. The autonomous cruise braking operation is the automatic brake operation that is executed to make the distance from the motorcycle 100 to the preceding vehicle approximate the distance reference value. As the distance from the motorcycle 100 to the preceding vehicle, the distance reference value is set to such a value that the driver safety can be secured.

In this case, more specifically, the peripheral environment detector 41 computes the braking force with which the distance from the motorcycle 100 to the preceding vehicle can promptly approximate the distance reference value while a collision of the motorcycle 100 with the preceding vehicle is avoided by the autonomous cruise braking operation, and sets such a braking force as the target braking force. Such a target braking force is computed on the basis of the body speed and a difference between the distance from the motorcycle 100 to the preceding vehicle and the distance reference value, for example.

The external force detector 42 detects an external force that acts on the motorcycle 100, and outputs a detection result. For example, the external force detector 42 includes: a first sensor 42a that detects presence/absence, a magnitude, an action position, or the like of the external force that acts on a rear surface of each handle grip 2a of the motorcycle 100; a second sensor 42b that detects presence/absence, a magnitude, an action position, or the like of the external force that acts on each portion of the motorcycle 100 abutting the driver's knee; and a third sensor 42c that detects presence/absence, a magnitude, an action position, or the like of the external force that acts on a seat 1a of the motorcycle 100.

The first sensor 42a is a strain gauge that is attached to the inside or an outer surface of each of the paired handle grips 2a of the motorcycle 100, for example. The driver increases engine torque of the motorcycle 100 by rotating one of the handle grips 2a. In addition, the driver pulls the first brake operation section 11 with his/her fingers while putting his/her palm against the handle grip 2a. In this way, the braking force is generated in the front wheel 3 of the motorcycle 100. Furthermore, the driver pulls a clutch lever (not depicted) with his/her fingers while putting his/her palm against the other one of the handle grips 2a. In this way, a clutch of the motorcycle 100 is brought into a disengaged state. During deceleration of the motorcycle 100, a force in an advancing direction acts on the driver. Thus, it can be said that a state where the driver puts his/her palms against the rear surfaces of the handle grips 2a in the advancing direction of the motorcycle 100 is a state with superior deceleration resistance. In other words, the first sensor 42a is provided at a position that is suited to acquire deceleration resistance information. The deceleration resistance information is information related to the driver's driving posture. Note that the first sensor 42a may be another contact sensor or another non-contact sensor as long as the first sensor 42a detects the presence/absence, the magnitude, or the action position of the external force that acts on the rear surface of each of the handle grips 2a in the motorcycle 100. In addition, the first sensor 42a may detect another physical quantity that can substantially be converted to the presence/absence, the magnitude, the action position, or the like of the external force.

The second sensor 42b is a strain gauge that is attached to the inside or an outer surface of the portion on each side of the trunk 1 of the motorcycle 100 (for example, a side portion of a fuel tank, or the like), and the portion abuts the driver's knee. During the deceleration of the motorcycle 100, the force in the advancing direction acts on the driver. Thus, it can be said that a state where the driver abuts his/her knees against the trunk 1 of the motorcycle 100 is the state with the superior deceleration resistance. In other words, the second sensor 42b is provided at a position that is suited to acquire the deceleration resistance information. The deceleration resistance information is the information related to the driver's driving posture. Note that the second sensor 42b may be another contact sensor or another non-contact sensor as long as the second sensor 42b detects the presence/absence, the magnitude, or the action position of the external force that acts on each of the portions of the motorcycle 100 abutting the driver's knee. In addition, the second sensor 42b may detect another physical quantity that can substantially be converted to the presence/absence, the magnitude, the action position, or the like of the external force.

The third sensor 42c is a strain gauge that is attached to the inside or an outer surface of an area of the seat 1a in the motorcycle 100 on which the driver is seated, for example. During the deceleration of the motorcycle 100, the force in the advancing direction acts on the driver. Thus, it can be said that a state where the driver is seated on the seat 1a is the state with the superior deceleration resistance. In other words, the third sensor 42c is provided at a position that is suited to acquire the deceleration resistance information. The deceleration resistance information is the information related to the driver's driving posture. Note that the third sensor 42c may be another contact sensor or another non-contact sensor as long as the third sensor 42c detects the presence/absence, the magnitude, or the action position of the external force that acts on the seat 1a of the motorcycle 100. In addition, the third sensor 42c may detect another physical quantity that can substantially be converted to the presence/absence, the magnitude, the action position, or the like of the external force.

The input device 46 receives a travel mode selection operation by the driver and outputs a signal that corresponds to the received operation. The input device 46 at least receives the selection operation to select the autonomous cruise travel mode as the travel mode. The autonomous cruise travel mode is a travel mode in which the motorcycle 100 continues traveling with behavior thereof being automatically and at least partially controlled. In the autonomous cruise travel mode, the motorcycle 100 is controlled such that the distance therefrom to the preceding vehicle approximates the distance reference value. For example, a lever, a button, or a touch screen is possibly used as the input device 46. The input device 46 is provided on the handlebar 2, for example.

The warning device 47 may warn the driver by sound, may warn the driver by a display, may warn the driver by vibrations, or may warn the driver by a combination of any of those. More specifically, the warning device 47 is a speaker, a display, a lamp, a vibrator, or the like, may be provided on the motorcycle 100, or may be provided in an accessory such as a helmet that is associated with the motorcycle 100. The warning device 47 outputs a warning to urge the driver to improve the deceleration resistance. The warning output by the warning device 47 is a voice or display warning that instructs the driver to hold the handle grips 2a, a voice or display warning that instructs the driver to abut his/her knees against the trunk 1, a voice or display warning that instructs the driver to be seated on the seat 1a, or the like, for example. The warning device 47 may output simple sound, simple lighting or flashing, simple vibrations, or the like as the warning. Even with such a warning, the driver who already recognizes a function thereof can be urged to improve the deceleration resistance.

The controller 60 controls the vehicle body behavior of the motorcycle 100. The controller 60 includes an acquisition section 61 and an execution section 62, for example. The acquisition section 61 acquires the information that is output from each of the various detectors and the input device 46, and outputs the acquired information to the execution section 62. The execution section 62 includes a trigger determination section 62a, a deceleration resistance determination section 62b, a control command setting section 62c, and a control section 62d, for example.

In accordance with a determination result by the trigger determination section 62a, the execution section 62 initiates the control mode that makes the motorcycle 100 execute the automatic brake operation. In addition, in the case where the deceleration resistance determination section 62b determines that the deceleration resistance information generated in accordance with the detection result of the external force detector 42 is information that is acquired in a state where the driver's deceleration resistance is low, the execution section 62 makes the control command setting section 62c change a control command to be output in the control mode. The determination is made by comparing a value as the deceleration resistance information and a threshold value. The control command setting section 62c sets the braking force that is generated in the motorcycle 100 by the automatic brake operation, initiation timing of the automatic brake operation, presence/absence or intensity of the warning to the driver, and the like, for example. The control section 62*d* outputs the control command that governs the operations of the inlet valves 31, the outlet valves 32, the pumps 34, the first valves 35, the second valves 36, and the like in accordance with the above settings, so as to generate the braking force in each of the wheels of the motorcycle 100 and execute the automatic brake operation. In addition, the control section 62*d* outputs the control command that governs the operation of the warning device 47 in accordance with the above settings, so as to urge the driver to improve the deceleration resistance.

In a state where the automatic brake operation is executed, the controller 60 opens the inlet valves 31, closes the outlet valves 32, closes the first valves 35, and opens the second valves 36. In the case where each of the pumps 34 is driven in such a state, the hydraulic pressure of the brake fluid in each of the wheel cylinders 24 is increased, and the braking force is exerted on each of the wheels (the front wheel 3 and the rear wheel 4).

The controller 60 may include a memory element, and the information such as the threshold value used in each processing executed by the controller 60 may be stored in the memory element in advance.

<Operation of Vehicle Body Behavior Control System>

A description will be made on an operation of the vehicle body behavior control system according to Embodiment 1.

Figure 4:
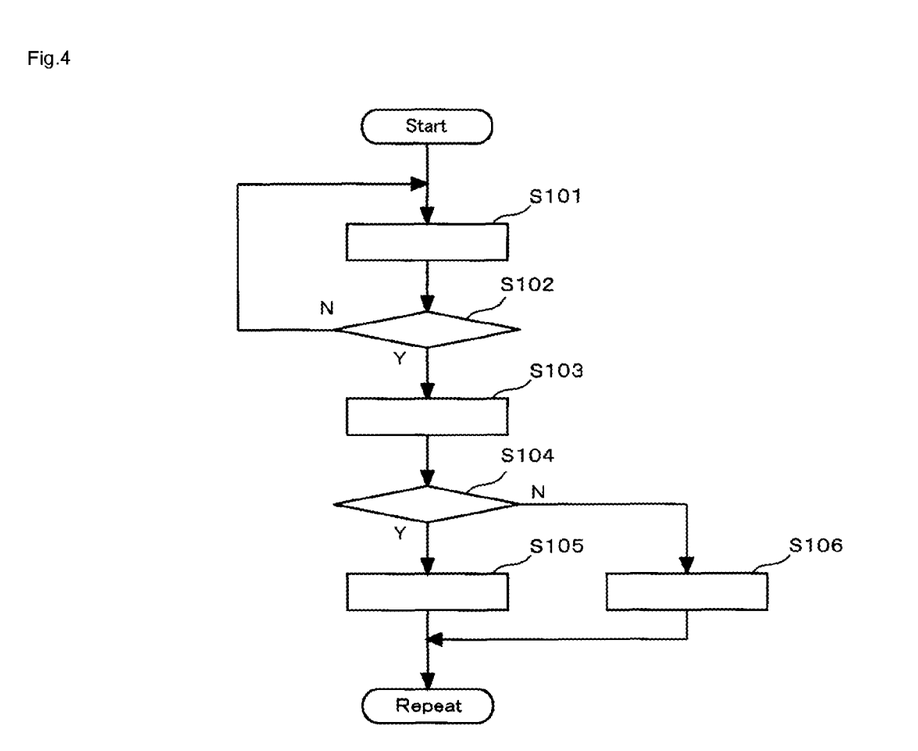
FIG. 4 is a flowchart of an operation of the vehicle body behavior control system according to Embodiment 1 of the present invention.

FIG. 4 is a flowchart of the operation of the vehicle body behavior control system according to Embodiment 1 of the present invention.

The controller 60 executes an operation flow depicted in FIG. 4 during travel of the motorcycle 100.

(Acquisition Step)

In step S101, the acquisition section 61 acquires the trigger information that is generated in accordance with the detection result of the peripheral environment detector 41.

(Execution Step)

In step S102, the trigger determination section 62*a* of the execution section 62 determines whether to initiate the control mode to make the motorcycle 100 execute the automatic brake operation on the basis of the trigger information acquired in step S101. If Yes, the processing proceeds to step S103. If No, the processing returns to step S101.

(Acquisition Step)

In step S103, the acquisition section 61 acquires the deceleration resistance information that corresponds to the detection result of the external force detector 42.

(Execution Step)

In step S104, the deceleration resistance determination section 62*b* of the execution section 62 determines whether the deceleration resistance information acquired in step S103 is information that is acquired in a state where the driver's deceleration resistance is sufficient. If Yes, the processing proceeds to step S105. If No, the processing proceeds to step S106.

For example, in the case where the presence/absence of the external force that acts on the rear surface of each of the handle grips 2*a* of the motorcycle 100 is acquired as the deceleration resistance information in step S103, the deceleration resistance determination section 62*b* determines a case where the external force is present as the state where the driver's deceleration resistance is sufficient, and determines a case where the external force is absent as a state where the driver's deceleration resistance is insufficient.

For example, in the case where the magnitude of the external force that acts on the rear surface of each of the handle grips 2*a* of the motorcycle 100 is acquired as the deceleration resistance information in step S103, the deceleration resistance determination section 62*b* determines a case where the external force is equal to or larger than the threshold value as the state where the driver's deceleration resistance is sufficient, and determines a case where the external force is smaller than the threshold value as the state where the driver's deceleration resistance is insufficient.

For example, in the case where the action position of the external force that acts on the rear surface of each of the handle grips 2*a* of the motorcycle 100 is acquired as the deceleration resistance information in step S103, the deceleration resistance determination section 62*b* determines a case where an offset amount of the action position from a reference position is equal to or smaller than the threshold value as the state where the driver's deceleration resistance is sufficient, and determines a case where the offset amount of the action position from the reference position is larger than the threshold value as the state where the driver's deceleration resistance is insufficient.

For example, in the case where the presence/absence of the external force that acts on each of the portions of the motorcycle 100 abutting the driver's knee is acquired as the deceleration resistance information in step S103, the deceleration resistance determination section 62*b* determines the case where the external force is present as the state where the driver's deceleration resistance is sufficient, and determines the case where the external force is absent as the state where the driver's deceleration resistance is insufficient.

For example, in the case where the magnitude of the external force that acts on each of the portions of the motorcycle 100 abutting the driver's knee is acquired as the deceleration resistance information in step S103, the deceleration resistance determination section 62*b* determines the case where the external force is equal to or larger than the threshold value as the state where the driver's deceleration resistance is sufficient, and determines the case where the external force is smaller than the threshold value as the state where the driver's deceleration resistance is insufficient.

For example, in the case where the action position of the external force that acts on each of the portions of the motorcycle 100 abutting the driver's knee is acquired as the deceleration resistance information in step S103, the deceleration resistance determination section 62*b* determines the case where the offset amount of the action position from the reference position is equal to or smaller than the threshold value as the state where the driver's deceleration resistance is sufficient, and determines the case where the offset amount of the action position from the reference position is larger than the threshold value as the state where the driver's deceleration resistance is insufficient.

For example, in the case where the presence/absence of the external force that acts on the seat 1*a* of the motorcycle 100 is acquired as the deceleration resistance information in step S103, the deceleration resistance determination section 62*b* determines the case where the external force is present as the state where the driver's deceleration resistance is sufficient, and determines the case where the external force is absent as the state where the driver's deceleration resistance is insufficient.

For example, in the case where the magnitude of the external force that acts on the seat 1*a* of the motorcycle 100 is acquired as the deceleration resistance information in step S103, the deceleration resistance determination section 62*b* determines the case where the external force is equal to or larger than the threshold value as the state where the driver's deceleration resistance is sufficient, and determines the case where the external force is smaller than the threshold value as the state where the driver's deceleration resistance is insufficient.

For example, in the case where the action position of the external force that acts on the seat 1a of the motorcycle 100 is acquired as the deceleration resistance information in step S103, the deceleration resistance determination section 62b determines the case where the offset amount of the action position from the reference position is equal to or smaller than the threshold value as the state where the driver's deceleration resistance is sufficient, and determines the case where the offset amount of the action position from the reference position is larger than the threshold value as the state where the driver's deceleration resistance is insufficient.

(Execution Step)

In step S105, the control command setting section 62c of the execution section 62 sets the braking force that is generated in the motorcycle 100 by the automatic brake operation to the normal target braking force. In addition, the control command setting section 62c of the execution section 62 sets the initiation timing of the automatic brake operation to normal timing. Furthermore, the control command setting section 62c of the execution section 62 sets the presence/absence of the warning generated in the control mode (that is, the warning that urges the driver to improve the deceleration resistance) to the absence. The control section 62d of the execution section 62 outputs the control command that corresponds to such settings and operates the hydraulic pressure control unit 50 and the warning device 47.

(Execution Step)

In step S106, the control command setting section 62c of the execution section 62 sets the braking force that is generated in the motorcycle 100 by the automatic brake operation to a smaller value than the normal target braking force. In addition, the control command setting section 62c of the execution section 62 sets the initiation timing of the automatic brake operation to later timing than the normal timing. Furthermore, the control command setting section 62c of the execution section 62 sets the presence/absence of the warning generated in the control mode (that is, the warning that urges the driver to improve the deceleration resistance) to the presence. The control section 62d of the execution section 62 outputs the control command that corresponds to such settings and operates the hydraulic pressure control unit 50 and the warning device 47.

Note that the description has been made so far on the case where the braking force generated in the motorcycle 100 and the initiation timing of the automatic brake operation are switched at two stages in accordance with the deceleration resistance information acquired in step S103; however, they may be switched at three or more stages. In addition, the description has been made so far on the case where the presence/absence of the warning is switched in accordance with the determination result in step S104; however, in the case where the warning is present, the intensity of the warning may be switched at two or more stages in accordance with the deceleration resistance information acquired in step S103. Furthermore, at least one of switching of the braking force generated in the motorcycle 100, switching of the initiation timing of the automatic brake operation, and switching of the presence/absence or the intensity of the warning may be conducted.

The description has been made so far on the case where the determination in step S104 is made at the stage prior to the execution of the processing in step S105 or step S106; however, the determination in step S104 may be made while the braking force is generated in the motorcycle 100 in step S105 or step S106. For example, in the cases where the processing in step S104 is executed while the braking force is generated in the motorcycle 100 in step S105 and where it is determined that the deceleration resistance information acquired at the time is not the information acquired in the state where the driver's deceleration resistance is sufficient, an increase in the braking force generated in the motorcycle 100 may be reduced, the automatic brake operation may be canceled, or the warning (that is, the warning that urges the driver to improve the deceleration resistance) may be issued. Meanwhile, for example, in the case where the processing in step S104 is executed while the braking force is generated in the motorcycle 100 or the initiation of the automatic brake operation is delayed in step S106 and where it is determined that the deceleration resistance information acquired at the time is the information acquired in the state where the driver's deceleration resistance is sufficient, an amount of the braking force generated in the motorcycle 100 may be increased, the automatic brake operation may be initiated, the warning (that is, the warning that urges the driver to improve the deceleration resistance) may be canceled, or the intensity thereof may be reduced.

<Effects of Vehicle Body Behavior Control System>

A description will be made on effects of the vehicle body behavior control system according to Embodiment 1.

The controller 60 includes: the acquisition section 61 that acquires the trigger information generated in accordance with the peripheral environment of the motorcycle 100; and the execution section 62 that initiates the control mode, in which the motorcycle 100 executes the automatic brake operation, in accordance with the trigger information acquired by the acquisition section 61 and makes the motorcycle 100 generate the braking force. In addition, the acquisition section 61 further acquires the deceleration resistance information that is the information related to the driver's driving posture on the motorcycle 100, and the execution section 62 changes the control command, which is output in the control mode, in accordance with the deceleration resistance information acquired by the acquisition section 61. Accordingly, in the case where the automatic brake operation that is unexpected by the driver is executed, the motorcycle 100 can be decelerated while the insufficient deceleration resistance of the driver's driving posture is taken into consideration. Therefore, safety of the motorcycle 100 is improved.

The execution section 62 preferably changes the braking force, which is generated in the motorcycle 100 by the automatic brake operation executed in the control mode, in accordance with the deceleration resistance information acquired by the acquisition section 61. The execution section 62 preferably changes the initiation timing of the automatic brake operation executed in the control mode in accordance with the deceleration resistance information acquired by the acquisition section 61. The execution section 62 preferably changes the presence/absence or the intensity of the warning in the control mode in accordance with the deceleration resistance information acquired by the acquisition section 61. In any of these cases, the safety of the motorcycle 100 is reliably improved.

The acquisition section 61 preferably acquires the deceleration resistance information on the basis of the detection result of the external force detector 42 that detects the external force acting on the motorcycle 100. Therefore, the safety of the motorcycle 100 is reliably improved.

In particular, the external force detector 42 preferably includes the first sensor 42a that detects the presence/absence, the magnitude, or the action position of the external force that acts on the rear surface of each of the handle grips 2a of the motorcycle 100. In such a case, it is possible to recognize the insufficient deceleration resistance that is caused when the driver does not appropriately hold the handle grips 2a. Therefore, the safety of the motorcycle 100 is reliably improved.

In particular, the external force detector 42 preferably includes the second sensor 42b that detects the presence/absence, the magnitude, or the action position of the external force that acts on each of the portions of the motorcycle 100 abutting the driver's knee. In such a case, it is possible to recognize the insufficient deceleration resistance that is caused when the driver does not provide appropriate knee grips. Therefore, the safety of the motorcycle 100 is reliably improved.

In particular, the external force detector 42 preferably includes the third sensor 42c that detects the presence/absence, the magnitude, or the action position of the external force that acts on the seat 1a of the motorcycle 100. In such a case, it is possible to recognize the insufficient deceleration resistance that is caused when the driver is not appropriately seated. Therefore, the safety of the motorcycle 100 is reliably improved.

The execution section 62 preferably changes the control command, which is output in the control mode, in accordance with a result of the comparison between the value acquired as the deceleration resistance information and the threshold value. Accordingly, the processing by the controller 60 is simplified, and thus throughput can be improved. Therefore, the safety of the motorcycle 100 is further reliably improved.

Embodiment 2

A description will hereinafter be made on a vehicle body behavior control system according to Embodiment 2.

Note that the overlapping or similar description to that on the vehicle body behavior control system according to Embodiment 1 will appropriately be simplified or omitted.

<Configuration of Vehicle Body Behavior Control System>

A description will hereinafter be made on a configuration of the vehicle body behavior control system according to Embodiment 2.

Figure 5:
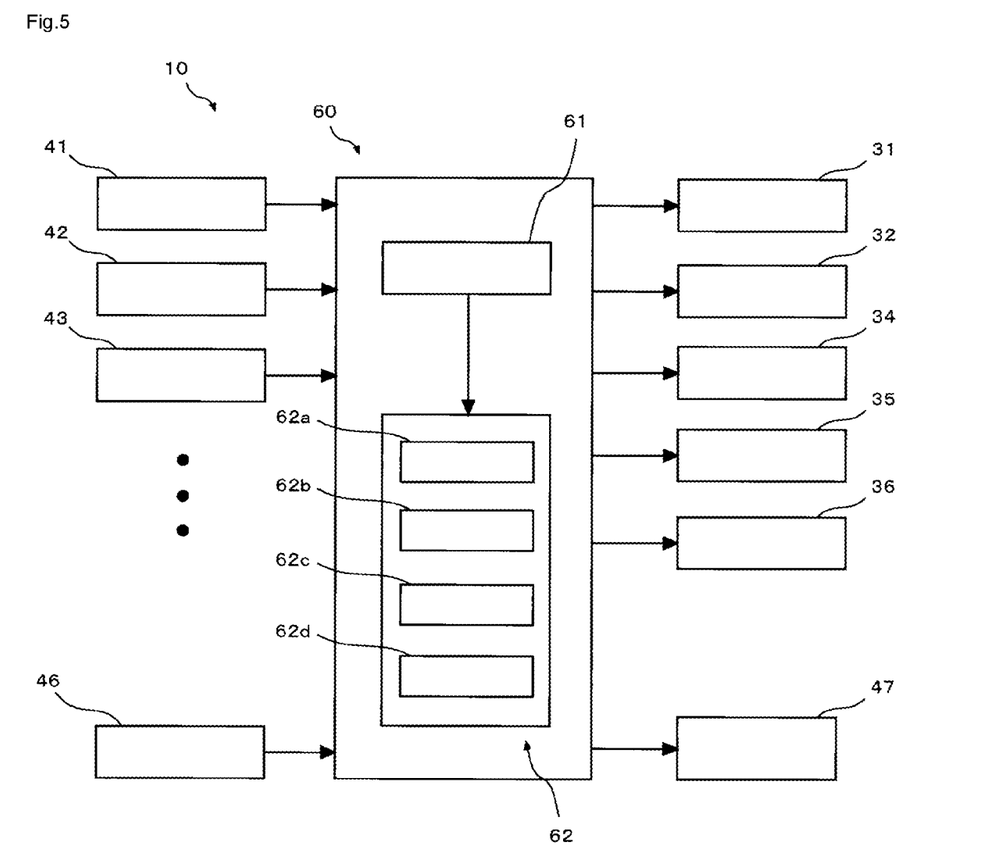
FIG. 5 is a system configuration diagram of a vehicle body behavior control system according to Embodiment 2 of the present invention.
Figure 6:
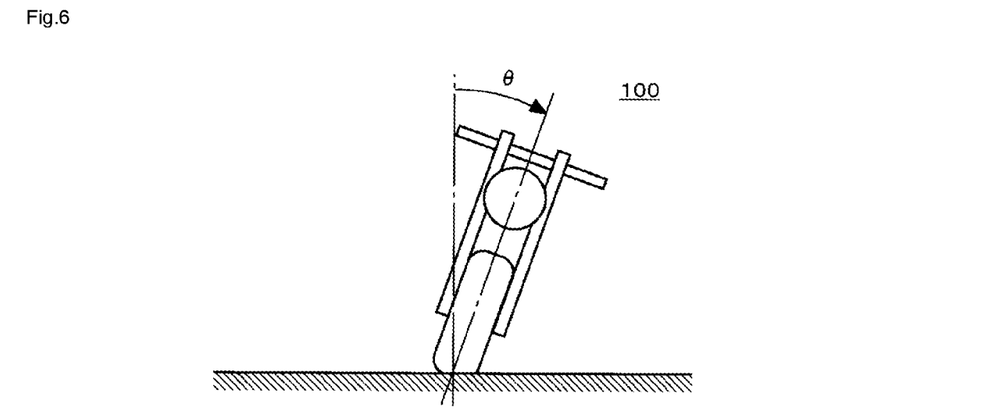
FIG. 6 is a view that defines a bank angle.

FIG. 5 is a system configuration diagram of the vehicle body behavior control system according to Embodiment 2 of the present invention. FIG. 6 is a view that defines a bank angle.

As depicted in FIG. 5, the vehicle body behavior control system 10 includes various detectors including the peripheral environment detector 41, the external force detector 42, and a vehicle body posture detector 43, the input device 46, and the warning device 47. Each of the various detectors, the input device 46, and the warning device 47 is communicable with the controller 60.

The vehicle body posture detector 43 detects information related to a bank angle of the motorcycle 100 and outputs a detection result. The bank angle corresponds to a tilt angle θ of the motorcycle 100 in a rolling direction with respect to an upper vertical direction depicted in FIG. 6. The vehicle body posture detector 43 may detect the bank angle of the motorcycle 100 itself or may detect another physical quantity that can substantially be converted to the bank angle. In addition, the vehicle body posture detector 43 may detect an angular velocity of the bank angle of the motorcycle 100 itself or may detect another physical quantity that can substantially be converted to the angular velocity of the bank angle. The vehicle body posture detector 43 is provided in the trunk 1.

<Operation of Vehicle Body Behavior Control System>

A description will be made on an operation of the vehicle body behavior control system according to Embodiment 2.

Figure 7:
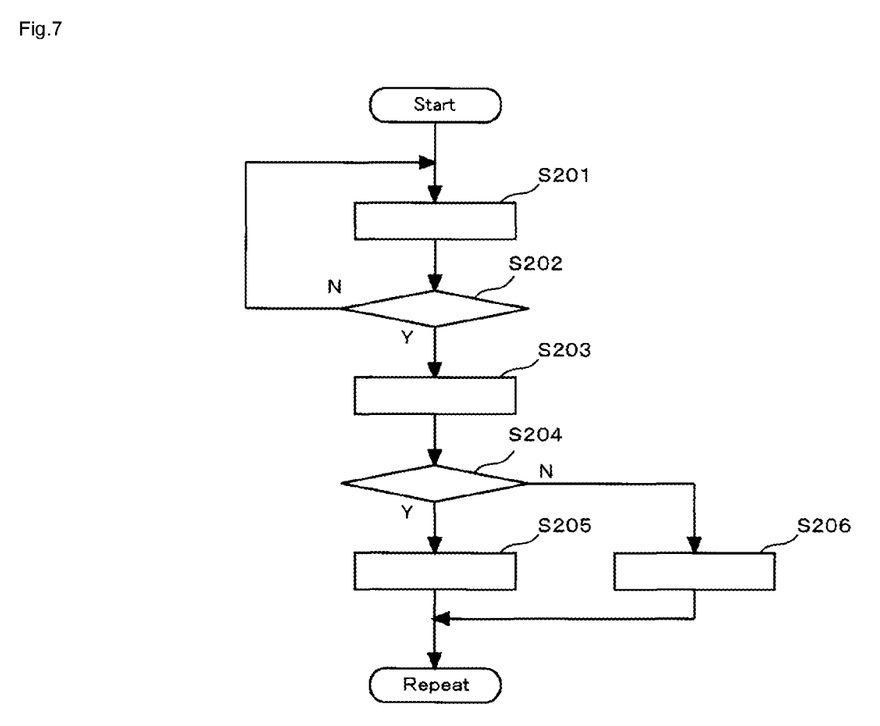
FIG. 7 is a flowchart of an operation of the vehicle body behavior control system according to Embodiment 2 of the present invention.

FIG. 7 is a flowchart of the operation of the vehicle body behavior control system according to Embodiment 2 of the present invention.

Because the step S201, step S202, step S205, and step S206 depicted in FIG. 7 are respectively similar to step S101, step S102, step S105, and step S106 depicted in FIG. 4, the description will only be made on step S203 and step S204.

(Acquisition Step)

In step S203, the acquisition section 61 acquires: the deceleration resistance information that corresponds to the detection result of the external force detector 42; and vehicle body posture information that corresponds to the detection result of the vehicle body posture detector 43.

(Execution Step)

In step S204, the deceleration resistance determination section 62b of the execution section 62 determines whether the deceleration resistance information acquired in step S203 is the information that is acquired in the state where the driver's deceleration resistance is sufficient on the basis of the comparison between the value acquired as the deceleration resistance information and a threshold value. The threshold value is set in accordance with the vehicle body posture information acquired in step S203. If Yes, the processing proceeds to step S205. If No, the processing proceeds to step S206.

For example, in the case where the deceleration resistance determination section 62b determines whether the deceleration resistance information is the information that is acquired in the state where the driver's deceleration resistance is sufficient by comparing the magnitude of the external force acting on the motorcycle 100 with the threshold value, the deceleration resistance determination section 62b changes the threshold value in accordance with the bank angle of the motorcycle 100 that is acquired as the vehicle body posture information. More specifically, the threshold value is increased as the bank angle is increased.

For example, in the case where the deceleration resistance determination section 62b determines whether the deceleration resistance information is the information that is acquired in the state where the driver's deceleration resistance is sufficient by comparing the magnitude of the external force acting on the motorcycle 100 with the threshold value, the deceleration resistance determination section 62b changes the threshold value in accordance with the angular velocity of the bank angle of the motorcycle 100 that is acquired as the vehicle body posture information. More specifically, the threshold value is increased as the angular velocity of the bank angle is increased.

For example, in the case where the deceleration resistance determination section 62b determines whether the deceleration resistance information is the information that is acquired in the state where the driver's deceleration resistance is sufficient by comparing the offset amount of the action position of the external force that acts on the motorcycle 100 from the reference position with the threshold value, the deceleration resistance determination section 62b changes the threshold value in accordance with the bank angle of the motorcycle 100 that is acquired as the vehicle body posture information. More specifically, the threshold value is reduced as the bank angle is increased.

For example, in the case where the deceleration resistance determination section 62b determines whether the deceleration resistance information is the information that is acquired in the state where the driver's deceleration resistance is sufficient by comparing the offset amount of the action position of the external force that acts on the motorcycle 100 from the reference position with the threshold value, the deceleration resistance determination section 62b changes the threshold value in accordance with the angular velocity of the bank angle of the motorcycle 100 that is acquired as the vehicle body posture information. More specifically, the threshold value is reduced as the angular velocity of the bank angle is increased.

<Effects of Vehicle Body Behavior Control System>

A description will be made on effects of the vehicle body behavior control system according to Embodiment 2.

The execution section 62 preferably changes the control command, which is output in the control mode, in accordance with the result of the comparison between the value acquired as the deceleration resistance information and the threshold value. Then, the acquisition section 61 further acquires the vehicle body posture information that is related to the bank angle generated in the motorcycle 100, and the execution section 62 changes the threshold value in accordance with the vehicle body posture information acquired by the acquisition section 61. Therefore, even in a situation where the large bank angle or the high angular velocity of the bank angle is generated in the motorcycle 100 and the large bank angle or the high angular velocity of the bank angle increases a demand on the deceleration resistance of the driver's driving posture, the safety of the motorcycle 100 can be improved.

The description has been made so far on Embodiment 1 and Embodiment 2. However, the invention is not limited to the description of each of the embodiments. For example, only a part of each of the embodiments may be implemented, or a part of one of the embodiments may be combined with the other embodiment. In addition, an order of steps in the operation flow depicted in each of FIG. 4 and FIG. 7 may be switched.

REFERENCE SIGNS LIST

1: trunk
1a: seat
2: handlebar
2a: handle grip
3: front wheel
3a: rotor
4: rear wheel
4a: rotor
10: vehicle body behavior control system
11: first brake operation section
12: front-wheel brake mechanism
13: second brake operation section
14: rear-wheel brake mechanism
21: master cylinder
22: reservoir
23: brake caliper
24: wheel cylinder
25: primary channel
26: secondary channel
27: supply channel
31: inlet valve
32: outlet valve
33: accumulator
34: pump
35: first valve
36: second valve
41: peripheral environment detector
42: external force detector
42a: first sensor
42b: second sensor
42c: third sensor
43: vehicle body posture detector
46: input device
47: warning device
50: hydraulic pressure control unit
51: base body
60: controller
61: acquisition section
62: execution section
62a: trigger determination section
62b: deceleration resistance determination section
62c: control command setting section
62d: control section
100: motorcycle

The invention claimed is:

1. An electronic processor that is configured to maneuver a motorcycle, the electronic processor configured to:
acquire trigger information generated based on a peripheral environment of the motorcycle; and
initiate a control mode that makes the motorcycle execute an automatic brake operation based on the trigger information and generate a braking force according to a control command, wherein, while in the control mode, the electronic processor is configured to
acquire deceleration resistance information related to a driving posture of a driver on the motorcycle during execution of the automatic brake operation based on a detection result of an external force detector configured to detect an external force acting on the motorcycle,
change the control command based on a result of a comparison between a value acquired as the deceleration resistance information and a threshold value, and
output the control command based on the deceleration resistance information, wherein the electronic processor is further configured to acquire additional deceleration resistance information during execution of the automatic brake operation and output another control command based on the additional deceleration resistance information, adjusting an amount of the braking force.

2. The electronic processor according to claim 1, wherein the electronic processor is configured to change:
a presence of a warning in the control mode based on the deceleration resistance information;
an absence of the warning in the control mode based on the deceleration resistance information; or
an intensity of the warning in the control mode based on the deceleration resistance information.

3. The electronic processor according to claim 2, wherein the warning is a warning that urges the driver to improve deceleration resistance.

4. The electronic processor according to claim 1, wherein the external force detector includes a sensor configured to detect:
a presence of an external force acting on a rear surface of a handle grip in the motorcycle;
an absence of the external force acting on the rear surface of the handle grip in the motorcycle;

a magnitude of the external force acting on the rear surface of the handle grip in the motorcycle; or an action position of the external force acting on the rear surface of the handle grip in the motorcycle.

5. The electronic processor according to claim 1, wherein the external force detector includes a sensor configured to detect:

a presence of an external force acting on a portion of the motorcycle abutting a knee of the driver;

an absence of the external force acting on the portion of the motorcycle abutting the knee of the driver;

a magnitude of the external force acting on the portion of the motorcycle abutting the knee of the driver; or an action position of the external force acting on the portion of the motorcycle abutting the knee of the driver.

6. The electronic processor according to claim 1, wherein the external force detector includes a sensor configured to detect:

a presence of an external force acting on a seat of the motorcycle;

an absence of the external force acting on the seat of the motorcycle;

a magnitude of the external force acting on the seat of the motorcycle; or an action position of the external force acting on the seat of the motorcycle.

7. The electronic processor according to claim 1, wherein the electronic processor is configured to acquire vehicle body posture information that is related to a bank angle generated in the motorcycle; and change the threshold value based on the vehicle body posture information.

8. The electronic processor according to claim 1, wherein the electronic processor is further configured to change an initiation timing of the automatic brake operation.

9. A control system for a motorcycle, the control system comprising:

a peripheral environment detector configured to detect a peripheral environment of the motorcycle; and an electronic processor configured to maneuver the motorcycle; and an external force detector configured to detect an external force acting on the motorcycle, wherein the electronic processor is configured to:

acquire trigger information generated based on a detection result of the peripheral environment detector; and initiate a control mode making the motorcycle execute an automatic brake operation based on the trigger information making the motorcycle generate a braking force according to a control command;

wherein, while in the control mode, the electronic processor is configured to acquire deceleration resistance information related to a driving posture of a driver on the motorcycle during execution of the automatic brake operation based on a detection result of the external force detector, change the control command based on a result of a comparison between a value acquired as the deceleration resistance information and a threshold value, and output the control command based on the deceleration resistance information, wherein the electronic processor is further configured to acquire additional deceleration resistance information during execution of the automatic brake operation and output another control command based on the additional deceleration resistance information, adjusting an amount of the braking force.

10. A motorcycle comprising:

the control system according to claim 9.

11. A control method that maneuvers a motorcycle, the control method comprising:

acquiring, by way of an electronic processor, trigger information that is generated based on a peripheral environment of the motorcycle; and initiating, by way of the electronic processor, a control mode that makes the motorcycle execute an automatic brake operation based on the trigger information and generate a braking force according to a control command, wherein the control mode includes acquiring deceleration resistance information related to a driving posture of the driver on the motorcycle during execution of the automatic brake operation based on a detection result of an external force detector configured to detect an external force acting on the motorcycle, changing the control command to be output based on a result of a comparison between a value acquired as the deceleration resistance information and a threshold value, and outputting the control command based on the deceleration resistance information, wherein the method further includes acquiring additional deceleration resistance information during execution of the automatic brake operation and output another control command based on the additional deceleration resistance information, adjusting an amount of the braking force.

* * * * *